3,001,921
HALOGENATED LACTONE POLYMER AND METHOD OF PREPARATION

Charles J. Pennino, Monroeville, Pa., assignor to The B. F. Goodrich Company, New York, N.Y., a corporation of New York
No Drawing. Filed May 3, 1960, Ser. No. 26,417
8 Claims. (Cl. 204—158)

This invention is concerned with a novel halogenated lactone polymer and more particularly pertains to the novel polyester of beta-hydroxy alpha-halopropionic acid and to methods for preparing same.

An object of the present invention is the provision of a novel adhesive and coating agent. Another object is the provision of a method for preparing a novel adhesive and coating agent. The means for the accomplishment of the foregoing and other objects will become apparent from the following description and examples, it being understood that numerous variations and changes can be made therein by those skilled in the art without a departure from the scope and spirit of this invention.

I have discovered a novel composition which may be described chemically as the polyester of a beta-hydroxy alpha-halopropionic acid having the repeating unit structure

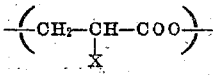

wherein X is Cl, Br, F or I. The compositions of this invention preferably have molecular weights of less than 10,000 and more preferably from about 800 to 2,000.

The polyester acid of beta-hydroxy propionic acid, also called "beta-propiolactone polymer," consists of carboxylate links. I have discovered that beta-propiolactone polymer having the unit structure.

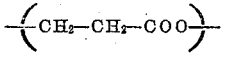

can be halogenated under carefully controlled conditions, to produce a novel product which is predominantly the polyester acid of alpha-halo-beta-hydroxy propionic acid. Stated differently, I have discovered that beta-propiolactone polymer can be halogenated predominantly in the alpha carbon position to produce a novel and useful composition of matter.

The nature of the end groups connected to the foregoing unit structures of beta-propiolactone polymer and the polyester of beta-hydroxy alpha-halo-propionic acid is of little consequence since the predominant portion of each polymer consists of the units as shown. However, the valence at the right of each of the foregoing structures is generally satisfied by a hydrogen atom (in which event the linear polyester is more appropriately called a linear polyester acid) or in the case of the halogenated polyester the valence at the right of the structure may also be satisfied by the group

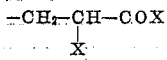

wherein X has the aforementioned designation. The end group at the left of each structure varies with the method by which the linear polyester is obtained but it generally is an acyloxy group of the type

wherein R is a hydrocarbon radical. In the case of the halogenated polyesters the R group may be

or

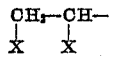

wherein X has the aforementioned designation.

In any event, it is to be understood that the beta-propiolactone polymers prepared by heating beta-propiolactone (1) in the presence of a mineral acid, (2) in the presence of the salt of a carboxylic acid, (3) an alkali metal halide, (4) an alkanol in the presence of an acid catalyst, (5) an alkanol in the presence of a basic catalyst as more fully described in U.S. Patent No. 2,526,554, or any other means are all embodied in this invention, the only requirement being that the polymers have the foregoing unit structures.

Beta-propiolactone polymer is prepared most conveniently by the procedure of Gresham, Jansen and Shaver, J. Am. Chem. Soc., 70, 998 (1948). The polymer thus prepared has been described as having an average molecular weight of from about 800 to 1000 as determined by cryoscopic and carboxyl end group analysis although polymers having somewhat higher and lower molecular weights are also useful in the present invention.

I have discovered that beta-propiolactone polymer can be halogenated directly or in an inert organic solvent under sub-atmospheric, atmospheric or super atmospheric pressures. In either case the halogenation is preferably carried out in an inert atmosphere with radiant energy such as ultra violet light activation at an elevated temperature and under the prevailing atmospheric pressure. The reaction temperature for the halogenation is preferably from about 60° C. to about 150° C. Generally the total elapsed time for reaction will vary from about 10 hours to 24 hours or more depending upon the temperature employed. Beta-propiolactone itself may be halogenated directly or in an inert diluent to form alpha-halo beta-propiolactone polymer in situ although the exact mechanism of this reaction is not clearly understood. Inert organic solvents which can be used as media for the halogenation reaction of beta-propiolactone polymer or beta-propiolactone include aliphatic carboxylic acids such as acetic acid, halogenated hydrocarbons such as carbon tetrachloride and strongly polar liquids such as dimethyl formamide and the like and others.

The preferred halogens useful in preparing the novel compositions of this invention are chlorine and bromine and the most preferred is chlorine.

The compositions embodied herein are particularly useful as adhesives and coating agents as well as for films, fibers and molded articles.

In the following examples will serve to illustrate the products and process of this invention.

Example I

A weight of 200 g. of beta-propiolactone was heated for 6 hours between 135–145° C. and upon cooling, a semi-solid beta-propiolactone polymer having a cryoscopic molecular weight of about 1000 was obtained. 197.9 g. of the foregoing polyester acid were chlorinated directly in the absence of air under a sun lamp by introducing chlorine gas into the reaction vessel while continuously stirring the reaction mixture. After the initial exothermic reaction subsided, the polymer was heated with continuous addition of chlorine to 120° C. and the reaction mixture was maintained thereafter at a temperature of from 120° C. to 130° C. during the chlorination. The reaction was stopped after a net increase in weight of 117.6 g. was obtained. The cooled reaction mixture was degassed at 70° C. and 49–20 mm. for three hours. The final mixture weighed 313.4 g.

A 10 g. sample of the chlorinated lactone polymer described above was dissolved in acetone and precipitated with hexane. The halogenated polyester was then redissolved in benzene and precipitated with hexane followed by washings with hexane and drying at 70° C. and 20 mm. for 48 hours. The chlorinated polylactone was found to be an excellent adhesive for polyethylene terephthalate-to-aluminum laminated structure and, in fact, is an excellent general purpose adhesive and coating agent for wood, metal and synthetic plastic surfaces.

*Analysis.*—Calculated for $C_3H_3ClO_2$: C, 34.08; H, 2.81; Cl, 33.3. Found: C, 32.36; H, 2.71; Cl, 35.72.

A 10 g. sample of the alpha-chlorinated beta-propiolactone polymer described above was washed thoroughly with water. The polymer was separated and dried for 20 hours at 70° C. and 1 mm.

*Analysis.*—Calculated for $C_3H_3ClO_2$: Cl, 33.33%. Found: Cl, 33.13.%.

Infrared analysis of this polymer revealed that it was predominantly alpha-chloro beta-propiolactone polymer.

A sample of the alpha-chlorinated beta-propiolactone polymer described immediately above was converted to methyl alpha-chloro acrylate with methanol and 85% phosphoric acid by the procedure described and claimed in my copending application Serial No. 26,427, filed May 3, 1960.

Example II

A sample of 1441 g. of polymerized beta-propiolactone having a molecular weight of about 800 in 237 g. of glacial acetic acid was chlorinated at 100 to 130° C. for 20 hours in the manner described in Example I. The mixture showed a net gain in weight of 786 g. A portion (1294 g.) of the reaction mixture was washed with water and 842.5 g. of chlorinated polymer were isolated after drying under reduced pressure for 36 hours.

*Analysis.*—Calculated for $C_3H_3ClO_2$: Cl, 33.33%. Found: Cl, 34.58%.

Infrared analysis of the product revealed that it was alpha-chloro beta-propiolactone polymer.

Example III

The procedure employed in Example II was repeated except that carbon tetrachloride was used in place of glacial acetic acid. A chlorinated polymer closely resembling the product of Example II resulted. In a similar manner predominantly alpha-chlorinated beta-propiolactone polymers were prepared at from 60–70° C. using dimethyl formamide as the reaction medium.

Alpha-bromo beta-propiolactone polymer was prepared in a manner similar to that described in this and the previous examples by substituting bromine for chlorine in the reaction mixture.

Example IV

A sample of 98 g. of beta-propiolactone was added slowly at a temperature of 17° C. under a sun lamp to 233 g. of carbon tetrachloride which was saturated with chlorine. Extreme caution must be used during the addition and the reaction temperature should be maintained below 100° C. At about 50° C. the reaction mixture became turbid upon the addition of about 30 g. of beta-propiolactone. During the reaction, the mixture thickened. The carbon tetrachloride was stripped from the reaction mixture and 145.5 g. of alpha-chloro beta-propiolactone polymer was isolated.

I claim:

1. A process for preparing a linear homopolyester of alpha-halo beta-hydroxypropionic acid having the unit structure

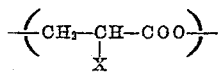

wherein X is selected from the group consisting of chlorine and bromine said method comprising reacting 100 parts of the linear homopolyester of beta-hydroxypropionic acid having a molecular weight of at least 800 with a member selected from the group consisting of about 103 parts of chlorine and about 232 parts of bromine at a temperature of from about 60° C. to about 150° C. in the presence of ultraviolet light.

2. The product of the process of claim 1.

3. A process for preparing a linear homopolyester of alpha-halo beta-hydroxypropionic acid having the unit structure

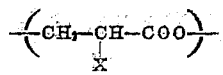

wherein X is selected from the group consisting of chlorine and bromine said method comprising reacting 100 parts of the linear homopolyester of beta-hydroxypropionic acid having a molecular weight of at least 800 with a member selected from the group consisting of about 103 parts of chlorine and about 232 parts of bromine in an inert diluent at a temperature of from about 60° C. to about 150° C. in the presence of ultraviolet light.

4. The product of the process of claim 3.

5. A process for preparing a linear homopolyester of alpha-chloro beta-hydroxypropionic acid having the unit structure

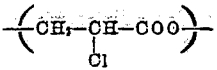

said method comprising reacting 100 parts of the linear homopolyester of beta-hydroxypropionic acid having a molecular weight of at least 800 with about 103 parts of chlorine in an inert diluent at a temperature of from 60° C. to about 150° C. in the presence of ultraviolet light.

6. The product of the process of claim 5.

7. The method for preparing a linear homopolyester of alpha-halo beta-hydroxypropionic acid having the structure

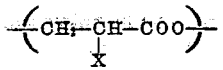

wherein X is a member selected from the group consisting of chlorine and bromine comprising reacting one mole of beta-propiolactone with substantially one mole of a member selected from the group consisting of chlorine and bromine.

8. The product of the process of claim 7.

References Cited in the file of this patent

UNITED STATES PATENTS

| | | |
|---|---|---|
| 2,311,534 | Gleason | Feb. 16, 1943 |
| 2,449,990 | Gresham | Sept. 28, 1948 |
| 2,449,994 | Gresham | Sept. 28, 1948 |
| 2,511,424 | Babayan | June 13, 1950 |
| 2,514,672 | Reynolds et al. | July 11, 1950 |
| 2,848,441 | Reynolds et al. | Aug. 19, 1958 |

FOREIGN PATENTS

| | | |
|---|---|---|
| 775,495 | Great Britain | Aug. 4, 1955 |